US008208697B2

(12) United States Patent
Schaffer et al.

(10) Patent No.: US 8,208,697 B2
(45) Date of Patent: Jun. 26, 2012

(54) METHOD AND APPARATUS FOR AUTOMATICALLY DEVELOPING A HIGH PERFORMANCE CLASSIFIER FOR PRODUCING MEDICALLY MEANINGFUL DESCRIPTORS IN MEDICAL DIAGNOSIS IMAGING

(75) Inventors: James David Schaffer, Wappingers Falls, NY (US); Walid Ali, Croton-On-Hudson, NY (US); Larry J. Eshelman, Ossining, NY (US); Claude Cohen-Bacrie, New York, NY (US); Jean-Michel Lagrange, Moissy Cramayel (FR); Claire Levrier, Rueil-Malmaison (FR); Nicholas Villain, Clamart (FR); Robert R. Entrekin, Kirkland, WA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1047 days.

(21) Appl. No.: 11/721,999

(22) PCT Filed: Dec. 13, 2005

(86) PCT No.: PCT/IB2005/054220

§ 371 (c)(1), (2), (4) Date: Jan. 16, 2008

(87) PCT Pub. No.: WO2006/064470

PCT Pub. Date: Jun. 22, 2006

(65) Prior Publication Data

US 2009/0268952 A1 Oct. 29, 2009

Related U.S. Application Data

(60) Provisional application No. 60/637,296, filed on Dec. 17, 2004.

(51) Int. Cl.
*G06K 9/36* (2006.01)

(52) U.S. Cl. ........ 382/128; 382/130; 382/132; 382/155; 382/156; 382/157

(58) Field of Classification Search .................. 382/128, 382/130, 131, 132, 155, 156, 157, 159; 702/19, 702/20, 21, 22, 23, 27
See application file for complete search history.

(56) References Cited

U.S. PATENT DOCUMENTS 5,754,676 A 5/1998 Komiya (Continued)

OTHER PUBLICATIONS

Rangayyan et al. "Measures of Acutance and Shape for Classification of Breast Tumors", IEEE Transactions on Medical Imaging, vol. 16 No. 6, Dec. 1997 pp. 799-810.*

(Continued)

*Primary Examiner* — David A Vanore
*Assistant Examiner* — Nicole Ippolito

(57) ABSTRACT

A method for determining the presence or absence of malignant features in medical images, wherein a plurality of base comparison or training images of various types of lesions taken of actual patient is examined by one or more image reading experts to create a first database array. Low-level features of each of the lesions in the same plurality of base comparisons or training images are determined using one or more image processing algorithms to obtain a second database array set. The first and second database array set are combined to create a training database array set which is input to a learning system that discovers/learns a classifier that maps from a subset of the low-level features to the expert's evaluation in the first database array set. The classifier is used to determine the presence of a particular mid-level feature in an image of lesion in a patient based solely on the image.

26 Claims, 5 Drawing Sheets

U.S. PATENT DOCUMENTS

| | | | | |
|---|---|---|---|---|
| 6,601,053 | B1 | 7/2003 | Schaffer | |
| 6,738,499 | B1 | 5/2004 | Doi | |
| 7,668,351 | B1 * | 2/2010 | Soliz et al. | 382/128 |
| 7,747,054 | B2 * | 6/2010 | Zhou et al. | 382/128 |
| 2003/0161513 | A1 | 8/2003 | Drukker | |
| 2004/0122705 | A1 | 6/2004 | Sabol | |
| 2004/0122787 | A1 | 6/2004 | Avinash | |
| 2004/0190763 | A1 | 9/2004 | Giger | |
| 2006/0013454 | A1 * | 1/2006 | Flewelling et al. | 382/128 |
| 2006/0018524 | A1 * | 1/2006 | Suzuki et al. | 382/128 |

OTHER PUBLICATIONS

Giger, "Computerized Analysis of Lesions in US Images of the Breast", Acad. Radiol. 1999, 6:665-674.

Eshelman, "The CHC Adaptive Search Algorithm: How to Have Safe Search When Engaging in Nontraditional Genetic Recombination", Foundations of Genetic Algorithms, Morgan Kaufmann, San Francisco, 1991, pp. 265-283.

Santaella C.H.M. et al.: "Classification of nodules in mammograms image by using wavelet transform", Medical Imaging 2003: Image Processing., Edited by Sonka, Milan; Fitzpatrick, J. Michael. Proceedings of the SPIE, vol. 5032, May 2003, pp. 908-918, XP002390390.

Mehul P. Sampat, Alan C. Bovik, and Mia K. Markey: "Classification of mammographic lesions into Bi-Rads shape categories using the beamlet transform", Medical Imaging 2005: Image Processing, J. Michael Fitzpatrick, Joseph M. Reinhardt, Editors—Proceedings of SPIE, vol. 5747, Apr. 2005, pp. 16-25, XP002390490.

Jiang H et al : "Detection of spicules in mammograms", Image Processing , 1997 Proceedings., International Conference on Santa Barbara ,CA , USA Oct. 26-29, 1997 , Los Alamitos , CA , USA , IEEE Comput . Soc , US , vol. 3 , Oct. 26, 1997, pp. 520-523 , XP010253800.

Rangaraj M Rangayyan et al: "Measures of Acutance and Shape for Classification of Breast Tumors" IEEE Transactions on Medical Imaging, IEEE Service Center, Piscataway, NJ, US, vol. 16, No. 6, Dec. 1997, XP011035689.

Lori Mann Bruce et al: "Classifying Mammographic Mass Shapes Using the Wavelet Transform Modulus-Maxima Method", IEEE Transactions on Medical Imaging, IEEE Service Center, Piscataway, NJ, US, vol. 18, No. 12, Dec. 1999, XP011035924.

Michael L Raymer et al: "Dimensionality Reduction Using Genetic Algorithms", IEEE Transactions on Evolutionary Computation, IEEE Service Center, New York, NY, US, vol. 4, No. 2, Jul. 2000, XP0110.

Todd C.A. and Naghdy G.: "Method for breast cancer classification based solely on morphological descriptors" Medical Imaging 2004: Image Processing, J. Michael Fitzpatrick, Milan Sonka, Editors—Proceedings of SPIE, vol. 5370, May 2004, pp. 857-867, XP002390491 the whole document.

Guld, "A Platform for Disturbed Image Processing and Image Retrieval", Visual Communications and Image Processing (VCIP) 2003, Jul. 8-11, 2003, (the whole document), Dept. of Medical Informatics, Dept. of Diagnostics Radiology, Aachen University of Technology, Germany.

Madabhushi, "Combining Low, High-Level and Empirical Domain Knowledge for Automated Segmentation of Ultrasonic Breast Lesions", Dept. of Bioengineering, Univ of PA,, IEEE Transactions on Medical Imaging, vol. 22, No. 2, Feb. 2003.

Fogel, "Using Evolutionary Computation to Learn About Detecting Breast Cancer", IEEE, 1999 Proceedings of the 1999 Congress on Evolutionary Computation, CEC 99., vol. 3, Jul. 6-9, 1999, pp. 1754, vol. 3, (the whole document), [FogelDB1999].

A. Thomas Stavros, MD et al, "Solid Breast Nodules: Use of Sonography to Distinguish Between Benign and Malignant Lesions", Radiology, vol. 196, 1995, pp. 123-134.

* cited by examiner

|   | A | B |
|---|---|---|
|   | 0 0 ... 0 | 1 1 ... 1 |
| 1 | x11, x12, x13, ..., x1A | 1 | x11, x12, x13, ..., x1A |

| | A | | B | |
|---|---|---|---|---|
| | 0 0 ... 0 | | 1 1 ... 1 | |
| 1 | x11, x12, x13, ..., x1A | 1 | x11, x12, x13, ..., x1A | |
| 2 | x21, x22, x23, ..., x2A | 2 | x21, x22, x23, ..., x2A | |
| • | | • | | |
| • | | • | | |
| • | | • | | |
| n0 | xn01, xn02, xn03, ..., xn0A | Z1 | xZ11, xZ12, xZ13, ..., xZ1A | |

| | | | |
|---|---|---|---|
| 22 | 43 | 73 | 131 |

METHOD AND APPARATUS FOR AUTOMATICALLY DEVELOPING A HIGH PERFORMANCE CLASSIFIER FOR PRODUCING MEDICALLY MEANINGFUL DESCRIPTORS IN MEDICAL DIAGNOSIS IMAGING

The present invention relates generally to the field of medical imaging and, more particularly, to a system and method for automatically selecting a high performance classifier for producing medically meaningful descriptors of features in ultrasound medical images.

Ultrasound, also referred to as diagnostic medical sonography, sonography, or echocardiography, is an imaging technique that utilizes high-frequency acoustical waves to produce images of structures within the human body. These images provide information that is useful in diagnosing and guiding the treatment of disease. For example, ultrasound is frequently employed during pregnancy to determine the health and development of a fetus. Ultrasound is also used as a diagnostic aid for recognizing subtle differences between healthy and unhealthy tissues in organs of the neck, abdomen and pelvis. It is also very useful in locating and determining the extent of disease in blood vessels. Ultrasound imaging of the heart is called echocardiography, and is used to diagnose many heart conditions. Accurate biopsy and treatment of tumors is facilitated through the use of ultrasound guidance procedures which provide images of healthy tissues in proximity to a tumor and a biopsy needle.

Conventional medical sonography is conducted with the use of diagnostic ultrasound equipment that transmits acoustical energy into the human body and receives signals that are reflected by bodily tissues and organs such as the heart, liver, and kidneys. The motion of blood cells causes Doppler frequency shifts in the reflected signals. In the time domain, these frequency shifts are observed as shifts in cross-correlation functions of the reflected signals. The reflected signals are typically displayed in a two-dimensional format known as color flow imaging or color velocity imaging. Such displays are commonly utilized to examine blood flow patterns. A typical ultrasound system emits pulses over a plurality of paths and converts echoes received from objects on the plurality of paths into electrical signals used to generate ultrasound data from which an ultrasound image can be displayed. The process of obtaining raw ultrasound data from which image data is produced is typically termed "scanning," "sweeping," or "steering a beam".

Sonography may be performed in real time, which refers to a rapid, sequential presentation of ultrasound images as scanning is performed. Scanning is usually performed electronically, utilizing a group of transducer elements (called an "array") arranged in a line and excited by a set of electrical pulses, one pulse per element for each of a plurality of cyclic sequences. Pulses are typically timed to construct a sweeping action throughout a diagnostic region to be imaged.

Signal processing in an ultrasound scanner commences with the shaping and delaying of the excitation pulses applied to each element of the array so as to generate a focused, steered and apodized pulsed beam that at least partially propagates into human tissue. Apodization refers to a process of tapering the beam using a weighting function to reduce or eliminate side lobes from the beam. The characteristics of the transmitted acoustic pulse may be adjusted or "shaped" to correspond to the setting of a particular imaging mode. For example, pulse shaping may include adjusting the length of the pulse depending on whether the returned echoes are to be used in B-scan, pulsed Doppler or color Doppler imaging modes. Pulse shaping may also include adjustments to the pulse frequency which, in modern broadband transducers, can be set over a wide range and may be selected according to the part of the body that is being scanned. A number of scanners also shape the envelope of the pulse (i.e., a Gaussian envelope) to improve the propagation characteristics of the resulting acoustical wave.

Echo signals resulting from scattering of the acoustical wave by tissue structures are received by all of the elements within the transducer array and are subsequently processed. The processing of these echo signals is typically performed at the individual element level, or at the channel level, wherein a channel includes one or more elements. Signal processing commences with the application of apodization functions, dynamic focusing, and steering delays. One of the most important elements in signal processing is beam formation. In a transducer array, the beam is focused and steered by exciting each of the elements at different times such that the acoustical wave transmitted by each element will arrive at an intended focal point simultaneously with the arrival of acoustical waves from all of the other elements in the array.

The American Cancer Society reported that breast cancer was a leading cause of death in women, causing an estimated 46,000 deaths per year. It is generally accepted that mammography is the most effective method for the early detection of breast cancer, and it has been shown that periodic screening of asymptomatic women does reduce mortality. Various medical organizations have recommended the use of mammographic screening for the early detection of breast cancer. Thus, mammography has become one of the largest volume x-ray procedures routinely interpreted by radiologists. Many breast cancers are detected and referred for surgical biopsy on the basis of a radiographically detected mass lesion or cluster of microcalcifications. Although general rules for the differentiation between benign and malignant mammographically identified breast lesions exist, considerable misclassification of lesions occurs with such conventional methods. On average, it has been reported that less than 30% of masses referred for surgical breast biopsy are actually malignant. A computerized method capable of detecting and analyzing the characteristics of benign and malignant masses, in an objective and reliable manner, can aid radiologists by reducing the number of false-positive diagnoses of malignancies, thereby decreasing patient morbidity, as well as the number of surgical biopsies performed and their associated complications.

Breast sonography is used as an important adjunct to diagnostic mammography and is typically performed to evaluate palpable and mammographically identified masses in order to determine their cystic or solid natures. The accuracy of ultrasound has been reported to be 96% to 100% in the diagnosis of simple benign cysts. Masses characterized as benign cysts do not require further evaluation. However, it has been reported that 75% of masses prove to be indeterminate or solid upon sonographic examination and thus, become candidates for further intervention.

In the past, ultrasound has not been used for screening purposes due to relatively high false-negative and false-positive rates. As set forth in Stavros et al., "Solid Breast Nodules: Use of Sonography to Distinguish Between Benign and Malignant Lesions," Radiology 196:123-134, 1995, which is incorporated herein by reference in its entirety, breast sonography is not routinely used to distinguish benign from malignant solid masses because of the considerable overlap and similarly in their sonographic appearances. With the advent of modern high-frequency transducers that have improved spatial and contrast resolution, a number of sonographic or mid-level features have emerged as potential indicators of malignancy, while other mid-level features are indicators for benign masses. For example, benign features include hyperechogenicity, ellipsoid shape, mild lobulation, and a thin, echogenic pseudocapsule. Malignant features include spiculation, angular margins, marked hypoechogenicity, posterior acoustic shadowing, and a depth:width ratio greater than 0.8. Stavros et al. have used these and other features to characterize masses as benign, indeterminate, and malignant. Their classification scheme has a sensitivity of 98.4% and a negative predictive value of 99.5%. However, the sonographic evaluation described by these investigators is much more extensive and complex than is usually performed at most breast imaging centers. Ultrasound examination is a notoriously operator-dependent modality, and until these encouraging results are corroborated through additional studies by other investigators, it is unclear how widely applicable this sonographic classification scheme will be.

An automated technique that can objectively and reliably classify lesions based upon reported sonographic characteristics of benign and malignant masses, especially if combined with their mammographic features, could significantly improve the specificity of breast imaging evaluation of breast masses. Computer-aided techniques have been applied to the color Doppler evaluation of breast masses with promising results. However, color Doppler imaging is a technique which focuses only upon the vascularity of lesions. Since not all sonographically visible cancers have demonstrable neovascularity, this technique is inherently somewhat limited.

Computer-aided diagnostic techniques applied to gray-scale sonographic images is another way to objectively and reliably classify lesions. However, such methods have been typically unreliable, since the ability to extract meaningful features from medical images is somewhat limited. For example, computer aided diagnosis from medical images (e.g., ultrasound, CT, MRI, or the like) depends on algorithms that extract features from images. These features are typically supplied to an algorithm so as to infer a final diagnosis (e.g., malignant or benign). This approach is constrained by the ability of algorithm designers to extract features that can provide the necessary inputs for rendering a diagnostic decision. In some cases, the diagnostic knowledge exists, but there are no known algorithms with which to extract the features necessary for rendering the diagnostic decision. Accordingly, there is a need for a method with which to bridge the gap between known diagnostic procedures that require mid-level features that cannot be computed by known conventional methods and known methods for extracting low-level features from medical images.

The present invention is a method and apparatus for computer-aided diagnosis based upon medical images, for example, determining the presence or absence of malignant features in ultrasound medical images taken of human patients.

Initially, a plurality of base comparison or training images of various types of lesions taken of actual patients are examined and analyzed by one or more image reading experts, such as physicians, radiologists, or specialized medical technicians. Although one image and one expert can be used, a greater number of images and a greater number of reliable, experienced experts will enhance the reliability of the present invention. Although two-dimensional images can be used, three-dimensional images may also be used. The images evaluated by the experts may be obtained by ultrasound, x-ray, CAT scan, nuclear magnetic resonance spectography, or the like. These experts each analyze each of these images, and based upon their education and experience, classify each of the observed lesions or other observed features in each of the images in accordance with a list of known possible mid-level features that may be observed in images of that type. For each possible mid-level feature, each expert provides a yes or no evaluation as to whether a malignant feature is present in the observed lesion to create a first database array. Examples of such mid-level features include abnormal depositions of calcium salts in tissue within the lesion, whether the lesion is a regular oval, and/or whether the lesion consists of elements that are not of the same kind or nature.

Next, low-level features of each of the lesions in the same plurality of base comparison or training images are determined using one or more image processing algorithms to obtain a second database array set. Among low-level features that may be obtained are Fourier descriptors, moments, shape, and stochastic, co-occurrence and autocorrelation parameters. Suitable algorithms include Fast Fourier Transforms (FFT), Inverse Fourier Transforms, histogram algorithms, means, variances and higher moments, or are disclosed in M. L. Giger et al., "Computerized Analysis of Lesions in US Images of the Breast", Acad. Radiol. 1999, 6:665-674.

The first database array set and the second database array set are then preferably combined to create a training database array set. Next, the training database array set is input to a learning system that develops a classifier that maps from at least a subset of the low-level features to the expert's yes or no evaluation in the first database array set of low-level features. Suitable classifiers include a neural network, and a Naïve Bayes classifier which is based on the so-called "Bayesian theorem," and is particularly suited when the dimensionality of inputs to a classifier is high.

A high performance classifier for mapping the low-level features to the expert generated mid-level features of the first data array is develops. Here, a genetic algorithm (GA) is preferably used to select a subset of features based on the low-level features in the training database array. A genetic algorithm employs a model of Darwinian evolution to discover high performance subsets of low-level features, where high performance is the tendency for a classifier to correctly classify specific training cases. Such a genetic algorithm is disclosed in Larry J. Eshelman, "The CHC Adaptive Search Algorithm: How to Have Safe Search When Engaging in Nontraditional Genetic Recombination," Foundations of Genetic Algorithms, Morgan Kaufmann, San Francisco, pgs. 265-283, 1991.

The classifier analyzes each of the entries of the first database array set and changes or optimizes its algorithm so that the corresponding mid-level feature as perceived by the expert is reliably obtained. In effect, the classifier "learns" to correctly predict mid-level features from the image processor generated low-level features based upon correlating the low-level features to the mid-level features determined by the experts.

Each subset includes numbers that correspond to specific low-level features in the training database array set. The GA includes a population of "chromosomes," and each chromosome possesses a set of genes, i.e. numbers that correspond to the specific low-level features of a lesion. For purposes of the present invention, a chromosome is a subset of the specific low-level features within the set of genes. In accordance with the method of the invention, the GA determines the chromosomes for providing an optimum classifier that will correctly "map" the low-level features of the lesion to the mid-level features of the lesion that were classified by the experienced experts.

Once the high performance classifier is determined, it may be used to determine the presence of a particular mid-level feature in an image of a lesion in a patient based solely on the image, preferably in digital form. The output can comprise, for example, the presence or absence of some medically meaningful feature or property or mid-level feature, such as, for example, abnormal depositions of calcium salts within tissue surrounding the lesion, whether the lesion is a regular oval, or whether the lesion consists of elements that are not of the same kind or nature. Alternatively, the input can be the low-level features of the actual image obtained using one or more image processing algorithms. The output is used by physicians, radiologists, or specialized medical technicians to aid in determining whether a lesion is benign or malignant.

In accordance with the method of the invention, an individual classifier is preferably used to generate each specific mid-level feature. That is, a classifier is used to determine whether the lesion includes one particular mid-level feature, another classifier is used to determined whether the lesion includes another mid-level feature, etc.

The present invention bridges the gap between known methods for extracting low-level features from medical images and known diagnostic procedures requiring mid-level features that cannot be computed by known conventional methods. Radiologist and other medical professionals are provided with the ability to rapidly verify/confirm the presence or absence of malignancies in lesions. In addition, the method of the invention effectively provides hospitals located in remote areas with access to an "expert" in the field of radiology.

The foregoing and other advantages and features of the invention will become more apparent from the detailed description of the exemplary embodiments of the invention given below with reference to the accompanying drawings in which.

Figure 1:
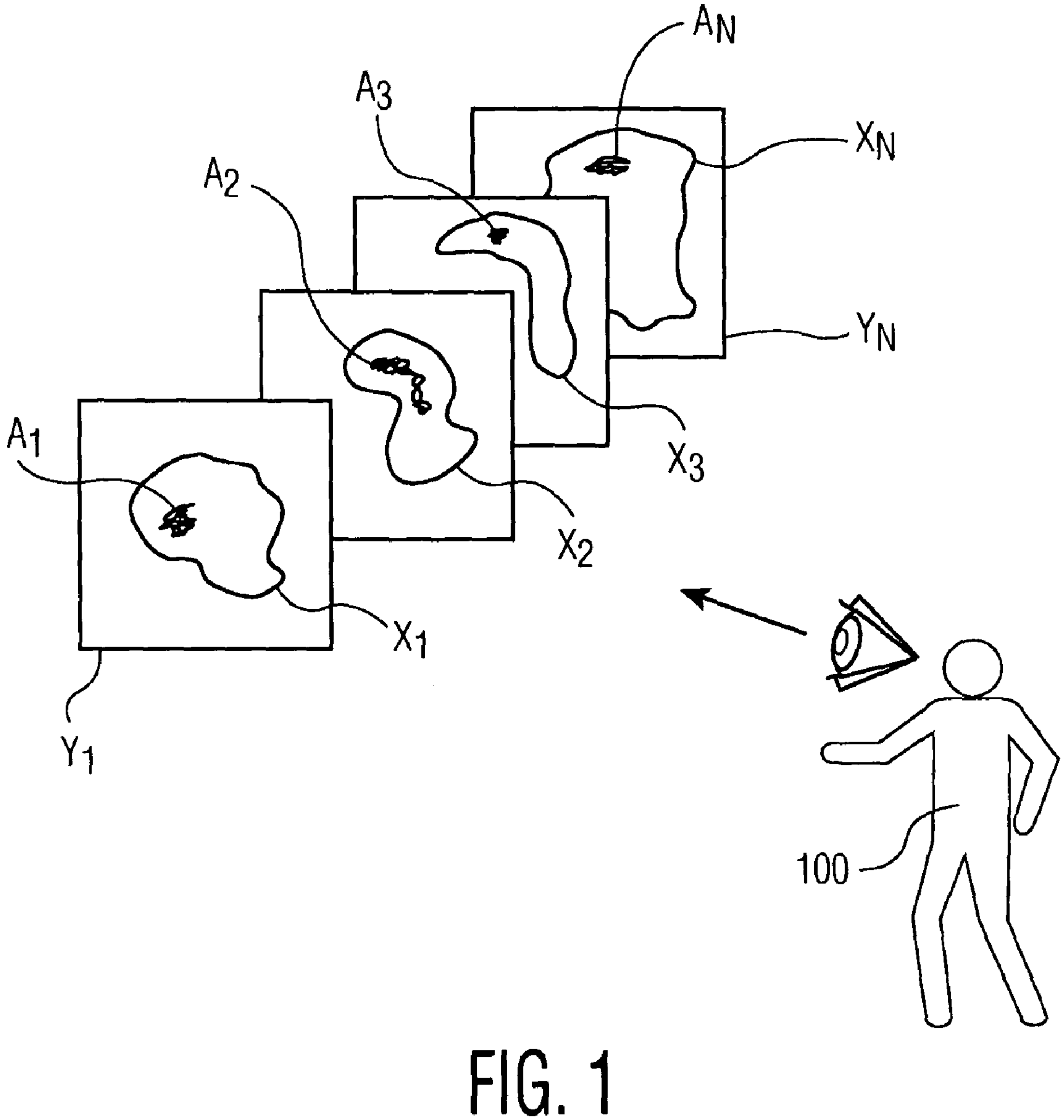
FIG. 1 is an illustration of multiple exemplary images having lesions that are evaluated by one or more experts.

The present invention is a method and apparatus for computer-aided diagnosis based upon medical images, for example, determining the presence or absence of malignant features in ultrasound medical images taken of human patients.

Initially, a plurality of base comparison or training images of various types of lesions taken of actual patients are examined and analyzed by one or more image reading experts, such as physicians, radiologists, or specialized medical technicians. Although one image and one expert can be used, a greater number of images and a greater number of reliable, experienced experts will enhance the reliability of the present invention. Although two-dimensional images can be used, three-dimensional images may also be used. The images evaluated by the experts may be obtained by ultrasound, x-ray, CAT scan, nuclear magnetic resonance spectography, or the like. These experts each analyze each of these images, and based upon their education and experience, classify each of the observed lesions or other observed features in each of the images in accordance with a list of known possible mid-level features that may be observed in images of that type. For each possible mid-level feature, each expert provides a yes or no evaluation as to whether a malignant feature is present in the observed lesion to create a first database array. Examples of such mid-level features include abnormal depositions of calcium salts in tissue within the lesion, whether the lesion is a regular oval, and/or whether the lesion consists of elements that are not of the same kind or nature. In the preferred embodiment, the mid-level features are evaluated by more than one expert, where the approach is taken that "more is better."

A predetermined vocabulary is used to define the mid-level features. In the preferred embodiment of the invention, the vocabulary that is used is obtained from Stavros et al. "Solid Breast Nodules: Use of Sonography to Distinguish Between Benign and Malignant Lesions," Radiology 196:123-134, 1995. In accordance with the invention, the final malignancy determination is made based on the algorithms proposed in Stavros A. T. et al. As defined by the American College of Radiology (ACR) BI-RADS, the algorithm proposed by Stavros et el. requires the use of the mid-level features of a lesion that is located in an object within an image. For malignant characteristics, the mid-level features are at least: i) spiculation, thick halo (unresolved); ii) angular margins; iii) microlobulation; iv) aspect ratio, i.e., the extent to which the object is taller than wider; v) calcifications; vi) duct extension and branching pattern; vii) calcifications; (viii) hypoechoic relative to fat (50% CA); and ix) heterogeneous texture.

For benign characteristics, the mid-level features are at least: i) the extent to which the lesion is wider than taller i.e., the inverse aspect ratio; ii) lobulation e.g., regular oval i.e., few lobulations; iii) continuous, smooth capsule; iv) and homogeneous texture.

With respect to the malignant characteristics, spiculation refers to the extent to which the lesion contains alternating hyperechoic and hypoechoic straight lines that radiate perpendicularly from the surface of the lesion or solid nodule shown in the image. In lesions surrounded by intensely echogenic fibrous tissue, only the echogenic speculations are sonographically visible in the image. Intensely echogenic tissue is tissue that is highly reflective. Echogenic refers to the tendency of tissue to reflect ultrasonic energy.

Angular margins refer to the junctions between the relatively hyperechoic or isoechoic central part of the solid nodule and the surrounding tissue. These angles may be acute, obtuse, or 90°.

Microlobulation occurs when many small (e.g., 1-2 mm) lobulations are found on the surface of the image object. Aspect ratio refers to the extent to which the object in the image is taller than wider. Calcifications are abnormal depositions of calcium salts within the tissue surrounding the object, as evidenced by a hardening of the tissue.

"Hypoechoic relative to fat" (50% CA) is the extent to which the object in the image is lighter when compared to the surround isoechoic fat.

A duct extension is a projection from the solid object that extends radially within or around ducts extending away from the nipple of a mammary gland. A branching pattern is defined as multiple projections from the object within or around the ducts extending away from the nipple.

The extent to which the surface of the object consists of elements that are of the same kind or nature is a measure of how heterogeneous it is.

With respect to the benign characteristics, the extent to which the lesion is wider than taller is the "inverse aspect ratio." Lobulation refers to the extent to which the boundary of the object in the image is wider than tall, i.e., whether the object is a regular oval i.e., few lobulations exhibits minute bumps and valleys above and below it's otherwise smooth oval shape. An object that has a homogeneous texture indicates that the object consists of elements that are not of the same kind or nature. One skilled in the art will recognize that other mid-level characteristics can be defined.

FIG. 1 is an exemplary illustration of multiple images $Y_{1 \ldots n}$ of objects $X_{1 \ldots n}$ having lesions $A_{1 \ldots n}$ that are evaluated by one or more experts 100. In accordance with the invention, the images (i.e., base comparison or training images) of the objects $X_{1 \ldots n}$ may be obtained by ultrasound, x-ray, CAT scan, nuclear magnetic resonance spectography, or the like. With reference to FIG. 1, each observed lesion $A_{1 \ldots n}$ within an object $X_n$ shown in an image $Y_{1 \ldots n}$ is evaluated by one or more experts 100, based on their education or experience to classify the mid-level features of the lesion $A_{1 \ldots n}$ to obtain a first database array set.

Next, low-level features of each of the lesions lesion $A_{1 \ldots n}$ in the same plurality of base comparison or training images are determined using one or more image processing algorithms to obtain a second database array set. Among low-level features that may be obtained are Fourier descriptors, moments, shape, and stochastic, co-occurrence and autocorrelation parameters. Suitable algorithms include Fast Fourier Transforms (FFT), Inverse Fast Fourier Transforms (IFFT), histogram algorithms, means, variances and higher moments, or are disclosed in M. L. Giger et al., "Computerized Analysis of Lesions in US Images of the Breast", Acad. Radiol. 1999, 6:665-674.

Figure 2:
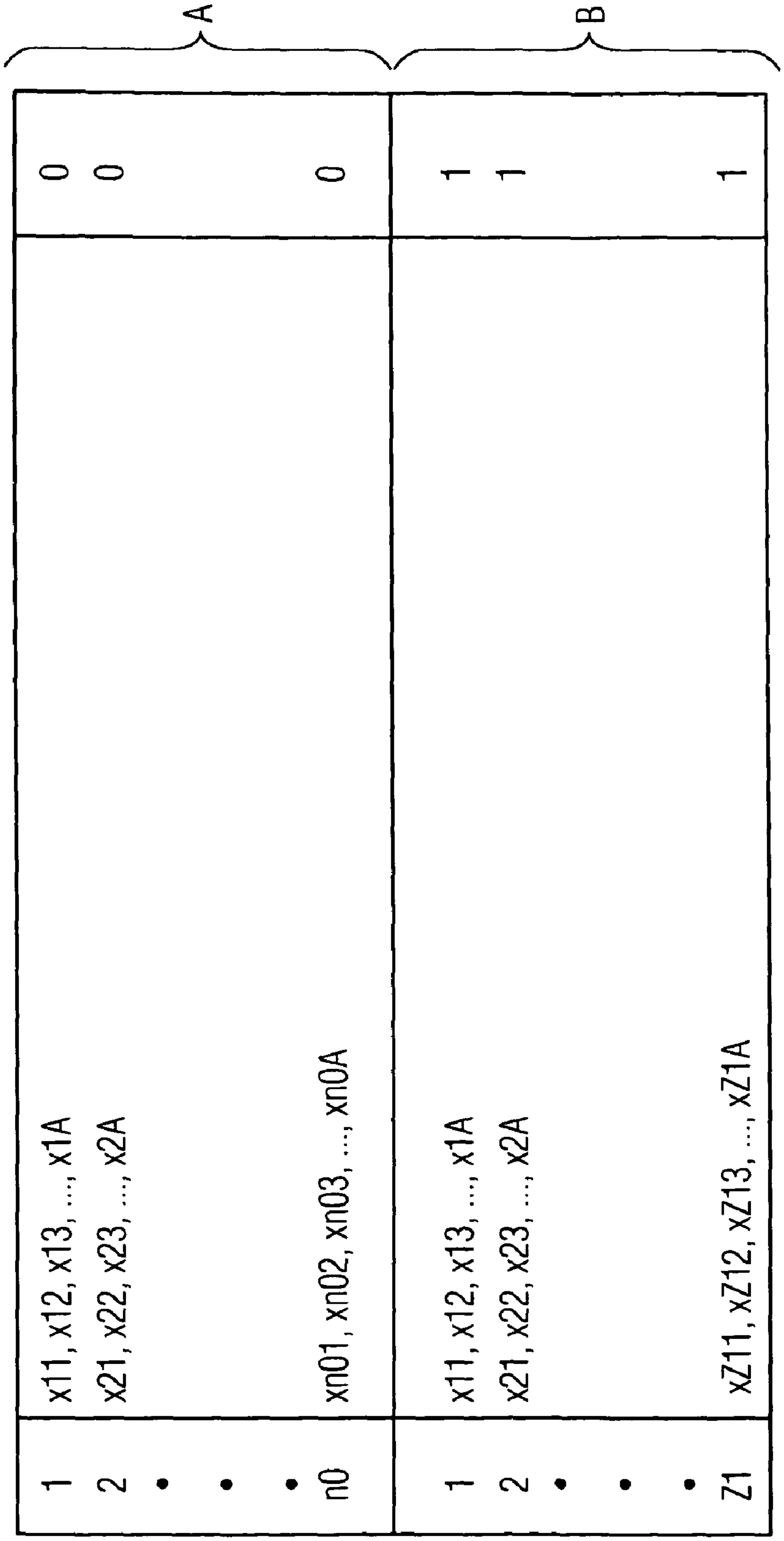
FIG. 2 is an illustration of an exemplary database array set, based on multiple images of FIG. 1, which combines the low-level features generated by the image processing algorithm and the mid-level features determined by the experts.

FIG. 2 is an illustration of an exemplary database array set, based on multiple images of FIG. 1, which combines the low-level features generated by the image processing algorithm and the mid-level features determined by the experts. When the expert 100 determines that a specific mid-level feature is present in an image Y, a 1 is entered and stored in the first database array set to indicate the presence of the mid-level feature in the image Y as shown in the third column. In FIG. 2, the parameters x11 . . . x1A of the database array set shown in the second column represent the low-level features from the image Y that are extracted from the image using the known image processing algorithms. The 0 in the expert classification column of the group of images A indicates the expert 100 concluded that the images $Y_{1\text{-}n0}$ do not contain a particular mid-level feature, and the 1 in the expert classification column for another group of images B indicates a conclusion was made that the images $Y_{1\text{-}z1}$ contain the particular mid-level feature. The images $Y_{1 \ldots n}$ of FIG. 1 are preferably evaluated by more than one expert and stored along with their evaluations in the data array set to increase the level of confidence in the validity of the predefined perception of medically meaningful features. In this case, an additional column of 1's and 0's is created in the first database array set of FIG. 2 for each respective expert.

The first database array set and the second database array set are then preferably combined to create a training database array set. Alternatively, the two database array sets need not be combined but separately used in combination. Next, the training database array set is input to a learning system that develops a classifier that accurately maps from at least a subset of the low-level features to the expert's yes or no evaluation in the first database array set of low-level features. Suitable classifiers include a neural network, such as the neural network described in U.S. Pat. No. 6,601,053, entitled "Optimized Artificial Neural Networks" which is incorporated herein by reference in its entirety, and a Naïve Bayes classifier which is based on the so-called "Bayesian theorem," and is particularly suited when the dimensionality of inputs to a classifier is high. A person skilled in the art would recognize that other classifiers may also be used.

Figures 3, 4:
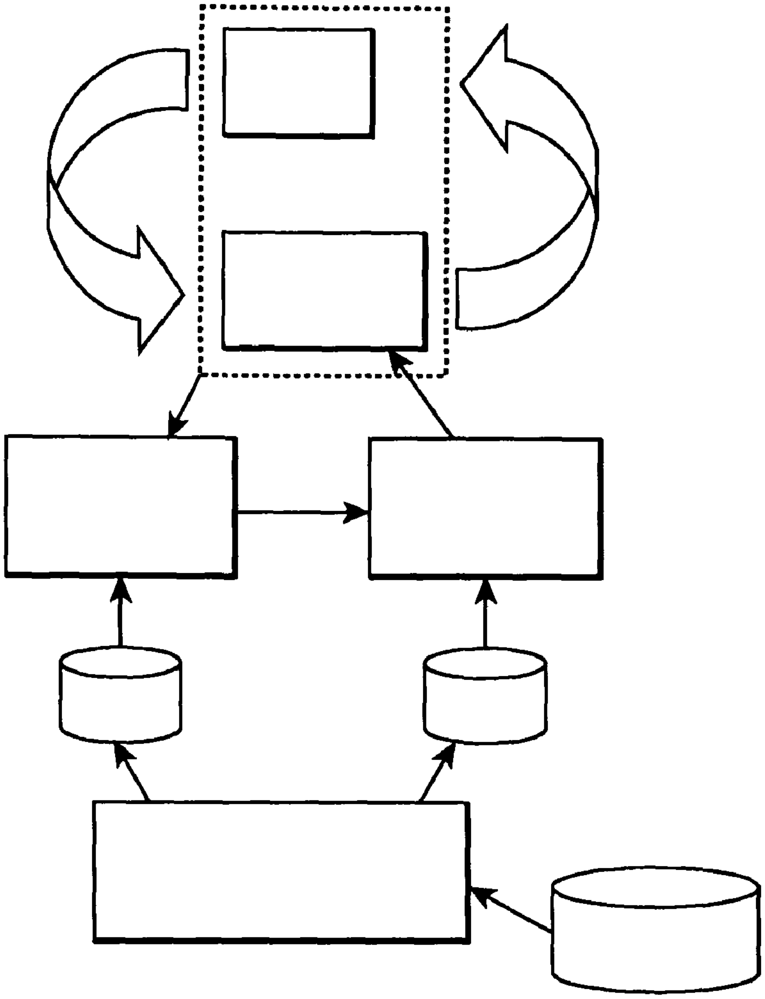
FIG. 3 is a schematic block diagram illustrating the functional objects associated with identifying the correct inputs to a classifier in accordance with the invention.
FIG. 4 is an illustration of an exemplary gene set of a chromosome.

FIG. 3 is a schematic block diagram illustrating the functional objects associated with identifying the correct inputs for a high performance classifier in accordance with the present invention. A high performance classifier for mapping the low-level features to the expert generated mid-level features of the first data array is developed by using a genetic algorithm (GA) to select a subset of features based on the low-level features in the training database array set, such as x11 . . . x1A, in the training database array set shown in FIG. 2. A genetic algorithm employs a model of Darwinian evolution to discover high performance subsets of low-level features, where high performance is the tendency for a classifier to correctly classify specific training cases. Such a genetic algorithm is disclosed in Larry J. Eshelman, "The CHC Adaptive Search Algorithm: How to Have Safe Search When Engaging in Nontraditional Genetic Recombination," Foundations of Genetic Algorithms, Morgan Kaufmann, San Francisco, pgs. 265-283, 1991.

The classifier analyzes each of the entries of the first database array set and changes or optimizes its algorithm as best as possible so that a corresponding mid-level feature as perceived by the expert is reliably obtained. In effect, the classifier "learns" to correctly predict mid-level features from the image processor generated low-level features based upon correlating the low-level features to the mid-level features determined by the experts.

Each subset includes integer numbers that correspond to specific low-level features x11 . . . x1A in the training database array set. Referring to FIG. 3, the GA includes a population of "chromosomes," each possessing a set of genes, i.e. numbers that correspond to the specific low-level features of a lesion. For purposes of the present invention, a chromosome specifies a subset of the specific low-level features within the set of genes, as disclosed below with respect to FIG. 4. The GA determines the chromosomes that will discover/learn a high performance classifier for mapping the low-level features of the lesion to the mid-level features of the lesion that were classified by the experts. For example, a neural network is chosen to perform the mapping. A set of input-output pairs for the network is provided, and the input-output pairs are divided into a training set and an evaluation set. The initially defined network is trained with the training set, and then evaluated with the evaluation set. The optimal neural network (s) with which to perform the optimisation is then selected.

Symbol strings representing the selected network architectures are modified to generate new symbol strings representing new neural network architectures. These new neural network architectures are then trained by the training set, evaluated by the evaluation set, and the best performing networks are again selected. Symbol strings representative of improved networks are again modified, and the process is continued until a sufficiently optimized network, i.e., a neural network is realized. For a detailed description of the process for optimising a neural network, reference may be made to U.S. Pat. No. 6,601,053 to Schaffer, et al., entitled "Optimized Artificial Neural Networks," which is incorporated herein in its entirety.

Once the high performance classifier is developed, it may be used to determine the presence of a particular mid-level feature in an image of a lesion in a patient based solely on the image, preferably in digital form. The output can comprise, for example, the presence or absence of some medically meaningful feature or property or mid-level feature, such as, for example, abnormal depositions of calcium salts within tissue surrounding the lesion, whether the lesion is a regular oval, or whether the lesion consists of elements that are not of the same kind or nature. Alternatively, the input can be the low-level features of the actual image obtained using one or more image processing algorithms. The output is used by physicians, radiologists, or specialized medical technicians to aid in determining whether a lesion is benign or malignant.

Figure 5:
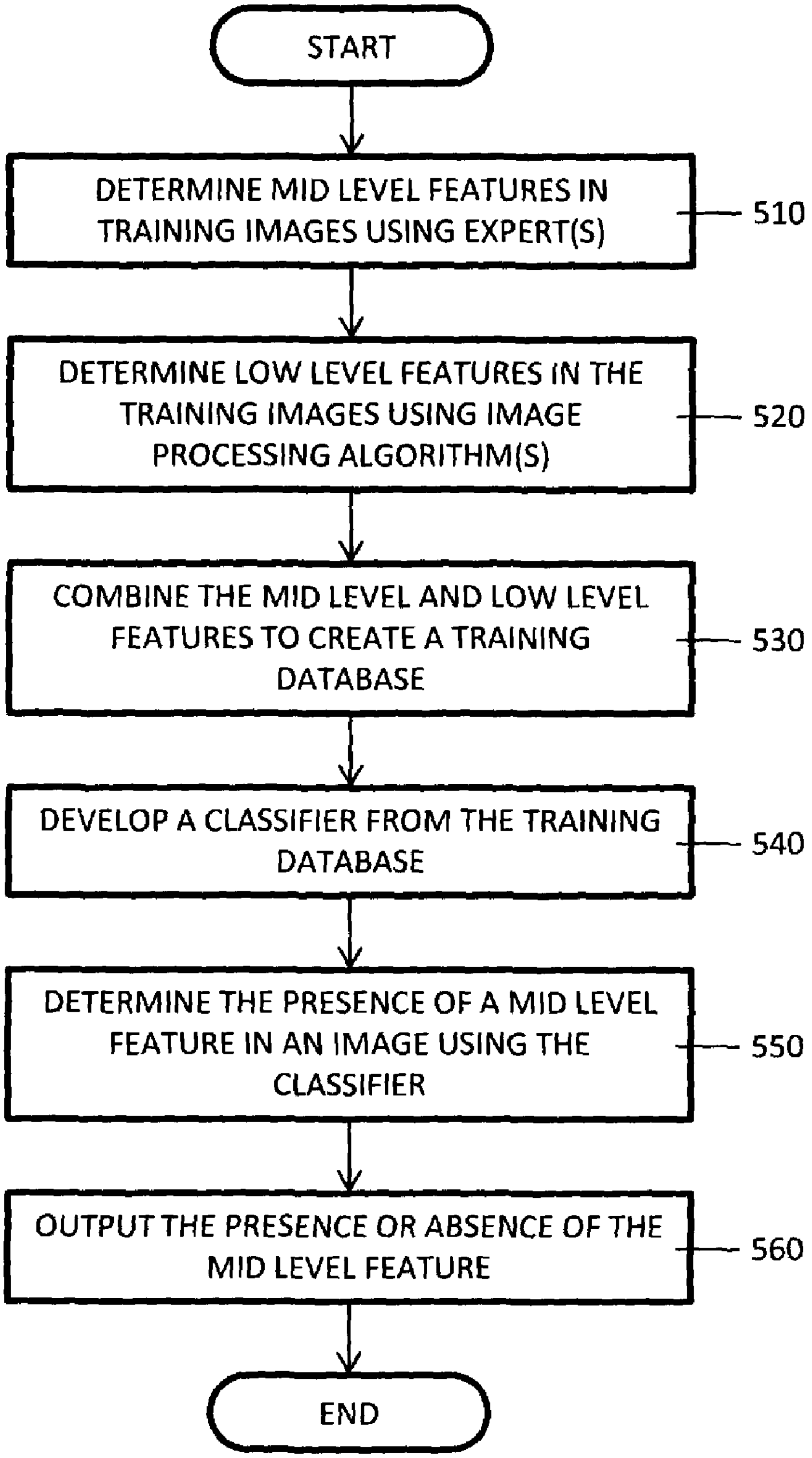
FIG. 5 is a flow chart illustrating the steps of the method in accordance with the present invention.

FIG. 5 is a flow chart illustrating the steps of the method in accordance with the present invention. The method of the invention is implemented by examining and analyzing a plurality of base comparisons or training images $Y_{1 \ldots n}$ of various types of lesions taken of actual patients to create a first database array, as indicated in step 510. Here, the images $Y_{1 \ldots n}$ are examined by one or more image reading experts 100, such as physicians, radiologists, or specialized medical technicians. Although one image Y and one expert 100 can be used, a greater number of images and a greater number of reliable, experienced experts will enhance the reliability of the present invention. Although two-dimensional images can be used, three-dimensional images may also be used.

The images $Y_{1 \ldots n}$ evaluated by the experts 100 may be obtained by ultrasound, x-ray, CAT scan, nuclear magnetic resonance spectography, or the like. These experts each analyze each of these images $Y_{1 \ldots n}$, and based upon their education and experience, classify each of the observed lesions $A_{1 \ldots n}$ or other observed features in each of the images in accordance with a list of known possible mid-level features that may be observed in images of that type. For each possible mid-level feature, each expert provides a yes or no evaluation as to whether a feature is present in the observed lesion to create the first database array. Examples of such mid-level features include abnormal depositions of calcium salts in tissue within the lesion, whether the lesion is a regular oval, and/or whether the lesion consists of elements that are not of the same kind or nature.

Next, low-level features of each of the lesions $A_{1 \ldots n}$ in the same plurality of base comparison or training images $Y_{1 \ldots n}$ are determined using one or more image processing algorithms to obtain a second database array set, as indicated in step 520. Among low-level features that may be obtained are Fourier descriptors, moments, shape, and stochastic, co-occurrence and autocorrelation parameters. Suitable algorithms include Fast Fourier Transforms (FFT), Inverse Fourier Transforms, histogram algorithms, means, variances and higher moments, or are disclosed in M. L. Giger et al., “Computerized Analysis of Lesions in US Images of the Breast”, Acad. Radiol. 1999, 6:665-674.

The first database array set and the second database array set are then combined to create a training database array set, as indicated in step 530. Alternatively, the two database array sets need not be combined but separately used in combination. Next, the training database array set is input to a learning system that develops a classifier that maps from a subset of the low-level features to the expert’s yes or no evaluation in the first database array set of low-level features, as indicated in step 540. Suitable classifiers include a neural network, and a Naïve Bayes classifier which is based on the so-called “Bayesian theorem,” and is particularly suited when the dimensionality of inputs to a classifier is high.

A high performance classifier for mapping the low-level features to the expert generated mid-level features of the first data array is developed by using a genetic algorithm (GA) to select a subset of features based on the low-level features in the training database array. A genetic algorithm employs a model of Darwinian evolution to discover high performance subsets of low-level features, where high performance is the tendency for a classifier to correctly classify specific training cases. Such a genetic algorithm is disclosed in Larry J. Eshelman, “The CHC Adaptive Search Algorithm: How to Have Safe Search When Engaging in Nontraditional Genetic Recombination,” Foundations of Genetic Algorithms, Morgan Kaufmann, San Francisco, pgs. 265-283, 1991.

Once the high performance classifier is developed, it is used to determine the presence of a particular mid-level feature in an image of a lesion in a patient based solely on the image, as indicated in step 550.

Finally, the presence or absence of the particular mid-level features is output for subsequent use in determining whether a lesion is benign or malignant, as indicated in step 560. The output can comprise, for example, the presence or absence of some medically meaningful feature or property or mid-level feature, such as, for example, abnormal depositions of calcium salts within tissue surrounding the lesion, whether the lesion is a regular oval, or whether the lesion consists of elements that are not of the same kind or nature. Alternatively, the input can be the low-level features of the actual image obtained using one or more image processing algorithms. The output is used by physicians, radiologists, or specialized medical technicians to aid in determining whether a lesion is benign or malignant.

In accordance with the method of the invention, an individual classifier is used to generate each specific mid-level feature. That is, a classifier is used to determined whether the lesion includes one particular mid-level feature, another classifier is used to determined whether the lesion includes another mid-level feature, etc.

The method of the present invention may be implemented using a conventional general purpose digital computer or micro-processor programmed according to the teachings of the present specification, as will be apparent to those skilled in the computer art. Appropriate software coding can readily be prepared by skilled programmers based on the teachings of the present disclosure, as will be apparent to those skilled in the software art.

The present invention includes a computer program product which is a storage medium including instructions which can be used to program a computer to perform the method of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media, including hard drives, suitable for storing electronic instructions.

Figure 6:
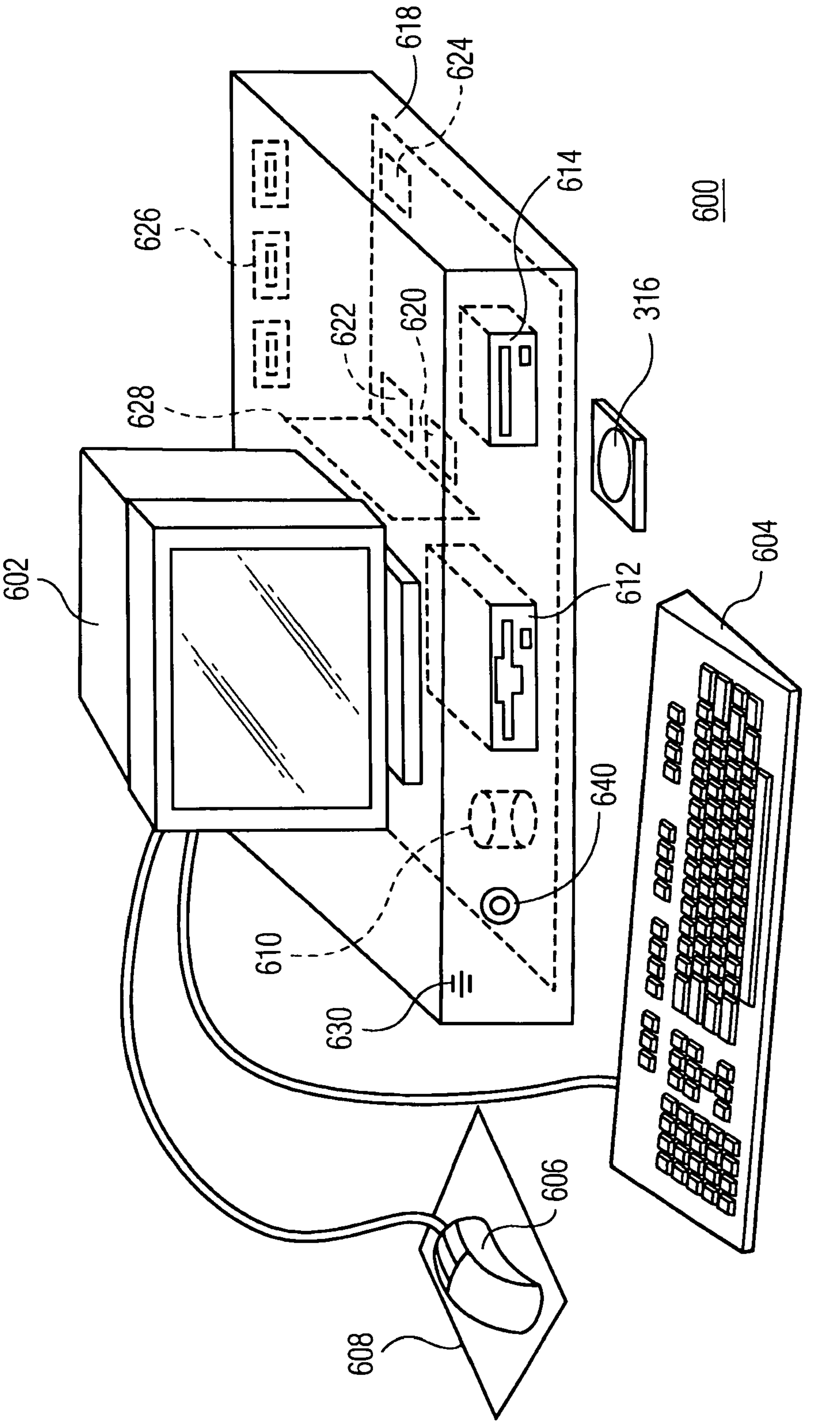
FIG. 6 is a schematic block diagram of a general purpose computer for implementing the method of the present invention.

FIG. 6 is a schematic block diagram of a general purpose computer 600 for implementing the method of the present invention. In FIG. 6, the computer 600, for example, includes a display device 602, such as a touch screen monitor with a touch-screen interface, a keyboard 604, a pointing device 606, a mouse pad or digitizing pad 608, a hard disk 610, or other fixed, high density media drives, connected using an appropriate device bus, such as a SCSI bus, an Enhanced IDE bus, a PCI bus, etc., a floppy drive 612, a tape or CD ROM drive 614 with tape or CD media 616, or other removable media devices, such as magneto-optical media, etc., and a mother board 618. The motherboard 618 includes, for example, a processor 620, a RAM 622, and a ROM 624, I/O ports 626 which are used to couple to an image acquisition device (not shown), and optional specialized hardware 628 for performing specialized hardware/software functions, such as sound processing, image processing, signal processing, neural network processing, etc., a microphone 630, and a speaker or speakers 640.

Stored on any one of the above described storage media (computer readable media), the present invention includes programming for controlling both the hardware of the computer 600 and for enabling the computer 600 to interact with a human user. Such programming may include, but is not limited to, software for implementation of device drivers, operating systems, and user applications. Such computer readable media further includes programming or software instructions to direct the general purpose computer 600 to perform tasks in accordance with the present invention.

The programming of general purpose computer 600 may include a software module for digitizing and storing images obtained from the image acquisition device. Alternatively, it should be understood that the present invention can also be implemented to process digital image data obtained by other means, such as a picture archiving and communications system (PACS).

Use of the apparatus and method of the invention provide a way to bridge the gap between known diagnostic procedures that require mid-level features that cannot be computed by known conventional methods and known methods for extracting low-level features from medical images. In addition, a medical professional with the ability to rapidly verify the presence or absence of malignant tumors. In addition, the apparatus and method of the invention effectively provides hospitals that are located in remote areas with access to an “expert” in the field of radiology.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for determining a presence of at least one medically meaningful feature in an object in an input medical image, comprising the steps of:

creating a first database comprising yes-or-no evaluations by at least one expert of at least one object in a plurality of training medical images, the yes-or-no evaluations indicating whether a plurality of medically meaningful features are present in the at least one object;

analyzing by a data processor the at least one object in the training medical images to identify features therein;

creating a second database comprising the identified features;

inputting the first and second databases into a plurality of classifiers, each of the plurality of classifiers specific to identifying a presence of a different one of the plurality of medically meaningful features;

for each of the plurality of classifiers, training by the data processor the each of the plurality of classifiers to map at least one of the features to a corresponding medically meaningful feature by correlating the identified features and the yes-or-no evaluations; and analyzing a medical image in the data processor and the trained plurality of classifiers to output at least one indication of a presence of the plurality of medically meaningful features of an object in the medical image.

2. The method of claim 1, wherein the at least one object is a lesion.

3. The method of claim 1, wherein at least one of the plurality of classifiers is a neural network.

4. The method of claim 1, wherein the yes-or-no evaluations include a classification of features, including the plurality of medically meaningful features, for each of the at least one object.

5. The method of claim 1, wherein the features are low-level features.

6. The method of claim 1, wherein the features are represented by at least one of Fourier descriptors, moments, shape, and stochastic, co-occurrence and autocorrelation parameters.

7. The method of claim 1, wherein at least one of the plurality of medically meaningful features is a mid-level feature.

8. The method of claim 7, wherein an individual classifier is used to perceive each medically meaningful feature.

9. The method of claim the method of claim 1, wherein at least one of the plurality of medically meaningful feature is at least one malignant characteristic.

10. The method of claim 9, wherein the malignant characteristic is at least one of spiculation, angular, microlobulation, aspect ratio, duct extension and branching patterns, calcifications, hypoechoic relative to fat, and heterogeneous texture.

11. The method of claim 1, wherein at least one of the plurality of medically meaningful features is at least one benign characteristic.

12. The method of claim 11, wherein the benign characteristic is at least one of an extent to which width exceeds height, lobulation, continuousness, smooth capsule nature, and homogeneous texture.

13. The method of claim 11, wherein an individual classifier is used to perceive each medically meaningful feature.

14. The method of claim 1, wherein the plurality of training medical images encompasses a full spectrum of expected malignancies.

15. The method of claim 1, further comprising:

the at least one of the features by using a genetic algorithm to select a gene subset of features, the gene subset including the at least one of the features.

16. The method of claim 15, wherein the genetic algorithm is an adaptive search algorithm.

17. The method of claim 15, wherein the features correspond to numbers in the gene subset.

18. The method of claim 15, wherein the gene subset belongs to a set of genes of a chromosome.

19. The method of claim 1, wherein said training step includes the step of generating a high performance classifier mapping the at least one of the features to the corresponding medically meaningful feature.

20. The method of claim 1, wherein said training step comprises the steps of:

providing a set of input-output pairs to at least one of the plurality of classifiers;

dividing the input-output pairs into a training set and an evaluation set;

adapting the at least one of the classifier with the training set; and evaluating the adapted at least one of the classifier with the evaluation set.

21. The method of claim 1, wherein at least one of the plurality of classifiers is a Naive Bayes classifier.

22. The method of claim 1, wherein an individual classifier is used to perceive each medically meaningful feature.

23. A method for determining a presence of at least one medically meaningful feature within an object in an image, comprising:

creating a first database having yes-or-no evaluations by at least one expert of at least one object in a plurality of training images, the yes-or-not evaluations indicating whether a plurality of medically meaningful features are present in the at least one object;

analyzing the at least one object in the at least one training image to identify features therein;

creating a second database of the identified features;

dividing the yes-or-no evaluations and the identified features into one or more training cases and one or more test cases;

iteratively developing a plurality of classifiers using a genetic algorithm until the classifiers achieve a predetermined performance, each of the plurality of classifiers specific to identifying a presence of a different one of the plurality of medically meaningful features, said iterative development including, for each of the plurality of classifiers:

selecting a subset of the identified features, the identified features corresponding to genes and the subset corresponding to a chromosome;

inputting the first and second database array sets into the each of the plurality of classifiers;

training the each of the plurality of classifiers to emulate a predefined perception of a corresponding medically meaningful feature based on the first and second databases by correlating the selected identified features and the yes-or-no evaluations of the training cases; and evaluating the each of the plurality of classifiers using the testing cases to determine a performance; and analyzing a medical image with the trained plurality of classifiers to output at least one indication of a presence of the plurality of medically meaningful features of an object in the medical image.

24. An apparatus for determining a presence of at least one medically meaningful feature in an object in an input medical image, comprising:

a first database for storing evaluations by at least one expert of at least one object in a plurality of training medical images;

a second data base for storing identified features of the training medical images;

a data processor operatively coupled to the second and first databases, said processor being operable to perform the steps of:

receiving the evaluations by the at least one expert of the at least one object in the plurality of training medical images;

storing the evaluations in the first database;

analyzing the at least one object in the training images to identify features therein;

storing the identified features in the second database;

dividing the evaluations and the identified features into one or more training cases and one or more test cases;

iteratively developing a classifier using a genetic algorithm until the classifier achieves a predetermined performance, said iterative development including:

selecting a subset of the identified features, the identified features corresponding to genes and the subset corresponding to a chromosome;

inputting the first and second databases into the classifier;

training the classifier to map the selected subset of the identified features to the at least one medically meaningful feature by correlating the selected identified features and the evaluations of the training cases; and evaluating the classifier using the testing cases to determine a performance; and analyzing a medical image in the trained classifier to output at least one indication of a presence of the at least one medically meaningful feature of an object in the medical image.

25. The apparatus of claim 24, wherein the classifier is a neural network or a Naive Bayes classifier.

26. The apparatus of claim 24, wherein the evaluations are yes-or-no evaluations.

* * * * *